(12) United States Patent
Giddings et al.

(10) Patent No.: US 10,941,590 B2
(45) Date of Patent: Mar. 9, 2021

(54) INERTIAL LOCK SYSTEMS FOR PUSH-PUSH LATCH STYLE VEHICLE DRAWERS

(71) Applicant: Ford Global Technologies LLC, Dearborn, MI (US)

(72) Inventors: James Andrew Giddings, Coburg (AU); Michael Neumann, Gisborne (AU); Tien Vo, Truganina (AU)

(73) Assignee: Ford Global Technologies LLC, Dearborn, MI (US)

( * ) Notice: Subject to any disclaimer, the term of this patent is extended or adjusted under 35 U.S.C. 154(b) by 478 days.

(21) Appl. No.: 15/891,829

(22) Filed: Feb. 8, 2018

(65) Prior Publication Data

US 2018/0266149 A1     Sep. 20, 2018

(30) Foreign Application Priority Data

Mar. 14, 2017   (CN) .......................... 201710150833.X

(51) Int. Cl.
*E05B 77/06*  (2014.01)
*E05B 83/28*  (2014.01)
(Continued)

(52) U.S. Cl.
CPC ................ *E05B 77/06* (2013.01); *B60R 7/08* (2013.01); *E05B 83/28* (2013.01); *E05C 3/12* (2013.01); *E05C 19/022* (2013.01); *E05C 3/006* (2013.01); *E05Y 2900/538* (2013.01); *Y10S 292/22* (2013.01); *Y10T 292/1043* (2015.04); *Y10T 292/1063* (2015.04); *Y10T 292/1092* (2015.04)

(58) Field of Classification Search
CPC ......... Y10T 292/0878; Y10T 292/1043; Y10T 292/1063; Y10T 292/1089; Y10T 292/1092; Y10S 292/04; Y10S 292/22; E05B 77/02; E05B 77/06; E05B 83/28; E05B 83/30; E05B 65/46; E05B 65/0014; E05C 19/022
See application file for complete search history.

(56) References Cited

U.S. PATENT DOCUMENTS 1,448,137 A * 3/1923 Lindsay ................... E05C 3/041
                                                            292/242
3,603,631 A * 9/1971 White ..................... E05C 19/022
                                                            292/220
(Continued)

FOREIGN PATENT DOCUMENTS

DE         3022556 A1 * 1/1982 ............. E05B 65/46
DE         9412661 U1 * 10/1994 ........... E05C 19/022
(Continued)

*Primary Examiner* — Carlos Lugo
(74) *Attorney, Agent, or Firm* — David Coppiellie; Kolitch Romano LLP

(57) ABSTRACT

Inertial lock systems for push-push latch style vehicle drawers or storage bins including an inertia lock to maintain a drawer in a closed position under a g-force. A shaft is rotatably mounted on a drawer housing; an inertia member is mounted on the shaft; and a confining member is mounted on the shaft and disposed opposite to the inertia member. The confining member is configured to move to a position to restrict movement of a rotating latch of the drawer when a g-forced applied to the drawer exceeds a predetermined level.

14 Claims, 9 Drawing Sheets

(51) Int. Cl.
*B60R 7/08* (2006.01)
*E05C 3/12* (2006.01)
*E05C 19/02* (2006.01)
*E05C 3/00* (2006.01)

(56) References Cited

U.S. PATENT DOCUMENTS

| | | | | |
|---|---|---|---|---|
| 3,854,784 | A * | 12/1974 | Hunt | G11B 23/0321 |
| | | | | 312/9.63 |
| 4,909,571 | A * | 3/1990 | Vidwans | B60N 2/433 |
| | | | | 297/378.11 |
| 5,052,728 | A | 10/1991 | Fukumoto | |
| 5,570,914 | A * | 11/1996 | Hughes | E05B 15/0093 |
| | | | | 292/130 |
| 5,611,579 | A * | 3/1997 | Kreitenberg | E05B 47/004 |
| | | | | 292/130 |
| 5,697,655 | A * | 12/1997 | Strong | E05C 3/14 |
| | | | | 292/230 |
| 5,845,954 | A * | 12/1998 | DePue | B60R 7/06 |
| | | | | 296/37.12 |
| 6,224,118 | B1 * | 5/2001 | Ashford | E05B 17/208 |
| | | | | 292/202 |
| 6,247,733 | B1 * | 6/2001 | Weiland | E05B 39/00 |
| | | | | 292/228 |
| 6,619,706 | B2 * | 9/2003 | Mackie | E05B 15/0093 |
| | | | | 292/130 |
| 6,666,485 | B1 * | 12/2003 | Moret | B65F 1/1615 |
| | | | | 220/315 |
| 6,808,214 | B2 * | 10/2004 | Sato | E05B 77/06 |
| | | | | 292/341.15 |
| 6,997,527 | B2 * | 2/2006 | Cheng | E05B 65/46 |
| | | | | 312/332.1 |
| 7,097,220 | B2 | 8/2006 | Haba | |
| 7,134,802 | B2 * | 11/2006 | Doerr | E05C 19/06 |
| | | | | 403/322.1 |
| 7,399,008 | B2 * | 7/2008 | Leopold | B60R 7/04 |
| | | | | 292/238 |
| 7,793,995 | B2 * | 9/2010 | King | E05B 77/06 |
| | | | | 292/332 |
| 8,038,185 | B2 * | 10/2011 | Wood | E05B 77/06 |
| | | | | 292/336.3 |
| 8,282,142 | B2 * | 10/2012 | Fannon | E05B 79/12 |
| | | | | 292/336.3 |
| 8,366,159 | B2 * | 2/2013 | Patel | E05B 77/06 |
| | | | | 292/336.3 |
| 8,398,130 | B2 * | 3/2013 | Park | E05B 83/28 |
| | | | | 292/333 |
| 8,469,411 | B2 * | 6/2013 | Costigan | E05B 85/16 |
| | | | | 292/336.3 |
| 8,505,988 | B2 * | 8/2013 | Hartford | E05C 19/10 |
| | | | | 292/230 |
| 9,714,530 | B2 * | 7/2017 | Amick | B60R 7/04 |
| 9,714,531 | B2 * | 7/2017 | Vigneau | E05B 77/42 |
| 2002/0171251 | A1 | 11/2002 | Bieck et al. | |
| 2005/0134056 | A1 * | 6/2005 | Dionysian | E05B 65/0014 |
| | | | | 292/253 |
| 2016/0174707 | A1 * | 6/2016 | Chan | E05C 17/02 |
| | | | | 312/333 |

FOREIGN PATENT DOCUMENTS

| | | | | |
|---|---|---|---|---|
| DE | 29702278 | U1 * | 4/1997 | ............ A47B 88/463 |
| DE | 10117482 | B4 * | 1/2008 | ............ B60N 3/083 |
| DE | 102010050800 | A1 | 5/2012 | |
| EP | 417394 | A1 * | 3/1991 | |
| EP | 0525811 | A1 | 2/1993 | |
| EP | 0561332 | A1 * | 9/1993 | ............ E05B 83/30 |
| FR | 2508775 | A1 * | 1/1983 | ............ B60N 3/083 |
| FR | 2549123 | A1 * | 1/1985 | ........... E05C 19/022 |
| FR | 2579181 | A1 * | 9/1986 | ........... E05C 19/022 |
| JP | 04213679 | A * | 8/1992 | |
| KR | 20030055384 | A * | 7/2003 | |
| KR | 100563730 | | * 3/2006 | |
| KR | 100645141 | B1 * | 11/2006 | |
| KR | 1020070066775 | | * 6/2007 | |
| WO | WO-2010011095 | | * 1/2010 | |
| WO | WO-2010011095 | A2 * | 1/2010 | ............ E05B 45/06 |
| WO | 2015057855 | A1 | 4/2015 | |

* cited by examiner

INERTIAL LOCK SYSTEMS FOR PUSH-PUSH LATCH STYLE VEHICLE DRAWERS

RELATED APPLICATION

This application claims the benefit of Chinese Patent Application No.: CN 201710150833.X filed on Mar. 14, 2017, the entire contents thereof being incorporated herein by reference.

FIELD

The present disclosure relates generally to mechanisms for automatically locking and unlocking vehicle drawers. In particular, locks that are activated to secure a push-push latched drawer by inertia upon experiencing high g-forces, such as those experienced in a vehicle collision, are described.

BACKGROUND

Many vehicles include drawers or storage bins for storage of miscellaneous items, e.g. spare change, personal accessories such as phones and glasses, etc. Often, these drawers are implemented using a push-push style of latch. A spring mechanism retains the drawer in an initial closed position. Push-push latches, as the name implies, are opened by a user pushing in on the drawer against the spring mechanism, causing it to unlatch. The user can then pull the drawer open or, in some implementations, the spring mechanism causes the drawer to automatically extend to a fully open position. To close and relatch the drawer, the user again pushes it in to the same position as when it was unlatched, which causes the drawer to be relatched and secured in a closed position.

Because a push-push latched drawer is unlatched merely by pushing the drawer in a particular direction, depending upon the orientation and contents of the drawer, it is possible that the drawer could become unlatched and open during a collision or heavy breaking such as might be encountered in a panic or emergency situation, which is not desired. For this reason, many jurisdictions require drawers to stay shut in the event of a collision to avoid inadvertent opening.

Examples of references in the prior art relevant to inertial lock systems for push-push latch style vehicle drawers include the following:

European Patent Application Publication No. 0 525 811 to United Technologies Automotive, Inc., discloses an inertially activated locking mechanism for a vehicle console compartment. The compartment in the publication swings down to open. The disclosed locking mechanism causes a pivotable stop to swing when sufficient g-forces are experienced and engage an aperture on the compartment, thereby locking the compartment in a closed position.

United States Patent Application Publication No. 2002/0171251 to Bieck et al. discloses a push-push style latch with an integral inertial locking mechanism. An "L" shaped arm is provided, with one end having a pin that interacts with the push-push latch, the other end having a counterweight, and a pivot point at the bend of the "L". Upon sudden deceleration, the counterweight acts through the pivot point to move the pin into a locked position, thereby preventing the push-push mechanism from unlatching.

SUMMARY

The present disclosure is directed to inertial lock systems for push-push latch style vehicle drawers or storage bins. According to a first aspect of the disclosed invention, an inertia lock to maintain a drawer in a closed position under a g-force comprises a shaft rotatably mounted on a drawer housing; an inertia member mounted on the shaft; and a confining member mounted on the shaft and disposed opposite to the inertia member. The confining member is configured to move to a position to restrict movement of a rotating latch of the drawer when a g-forced applied to the drawer exceeds a predetermined level.

In one embodiment, the confining member is configured to enclose a body of the rotating latch when activation of the inertial member causes the confining member to rotate down to the position to restrict the movement of the rotating latch.

In another embodiment, the inertia member is a plate and the confining member has a claw-like shape, and wherein a mass of the inertia member is greater than that of the confining member.

In another embodiment, the inertia lock further comprises two side stoppers disposed on the shaft and the confining member is disposed between the two side stoppers.

In yet another embodiment, the side stoppers are rings surrounding the shaft.

In still another embodiment, the inertia member, the confining member, the shaft, and the side stoppers are formed integrally via an injection molding.

According to a second aspect of the disclosed invention, an inertial latching system in a drawer comprises a rotating latch mounted on a surface of a drawer and configured to rotate around an axis on the drawer housing between a latched and unlatched position; and an inertial lock mounted on the drawer housing. The inertia lock includes a shaft rotatably mounted on the drawer housing, an inertia member and a confining member. The confining member and the inertia member are mounted on the shaft and disposed opposite each other. The inertia lock is configured to be activated to cause the confining member to move to a position to restrict movement of the rotating latching such that the rotating latch is maintained in the latched position when a g-forced applied the drawer exceeds a predetermined level.

In one embodiment, the rotating latch is configured to retain and release a pin mounted on the drawer via rotation. The drawer is capable of being opened when the pin is released from the rotating latch at the unlatched position and is closed when the pin is retained in the rotating latch at the latched position.

In another embodiment, the inertia lock is disposed above the rotating latch.

In another embodiment, the confining member includes two side walls configured to at least partially enclose the rotating latch when the inertia lock is activated and the confining member is rotated down to the surface of the drawing housing.

In another embodiment, the inertia lock further includes two side stoppers disposed adjacent and outside to the two side walls of the confining member, respectively.

In yet another embodiment, each side stopper is configured to engage with a corresponding shoulder portion on the drawer housing to prevent lateral movement of the shaft.

In another embodiment, the rotating latch includes an arm and a hand configured to retain the pin.

In another embodiment, the inertia member is a plate and the confining member has a claw-like structure, and the claw-like structure is disposed above the hand of the rotating latch at an un-activated state and the claw-like structure at least partially encloses the hand of the rotating latch at an activated state.

In still another embodiment, the inertia member returns to an un-activated state when the applied force is reduced to a level under the predetermined value and the confining member is located outside a path of movement of the rotating latch at the un-activated state.

According to a third aspect of the disclosed invention, a drawer in a vehicle comprises a drawer including a pin; a drawer housing enclosing the drawer; a rotating latch mounted on an outer surface of the drawer housing and configured to retain and release the pin of the drawer via rotation, wherein the drawer is capable of being opened when the pin is released from the rotating latch and is closed when the pin is retained in the rotating latch, an inertia lock mounted on the outer surface of the drawer housing, wherein the inertia lock includes a shaft rotatably mounted on the drawer housing, an inertia member mounted on the shaft and a confining member mounted on the shaft, wherein the confining member is disposed opposite to the inertia member, and wherein the inertia lock is configured to be activated to cause the confining member to move to a position to restrict movement of the rotating latching when a g-force applied the drawer exceeds a predetermined level, and a spring mounted on the drawer and configured to bias the drawer to an open position when the pin is released from the rotating latch.

In one embodiment, the inertia lock further includes two side stoppers disposed adjacent and outside to the confining member.

In another embodiment, the drawer further comprises two shoulder portions on the outer surface of the drawer housing, and two protrusions on the outer surface of the drawer housing, each side stopper is disposed against a corresponding shoulder portion on the drawer housing and a contact between the side stopper and the shoulder portion prevents lateral movement of the shaft, and each of the protrusions includes a recess to receive the shaft.

In yet another embodiment, the rotating latch includes an arm having one end fixed to the drawer housing and a hand configured to receive the pin, the rotating latch is configured to rotate around an axis substantially perpendicular to the outer surface of the drawer housing, and the rotating latch lays on the outer surface of the drawer housing.

In still another embodiment, the inertia member is a plate and the confining member has a claw-like structure, the inertia lock is disposed above the rotating latch, and the plate raises up to rotate the claw-like structure down so as to partially enclose the hand of the rotating latch when the inertia clock is activated.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1A:
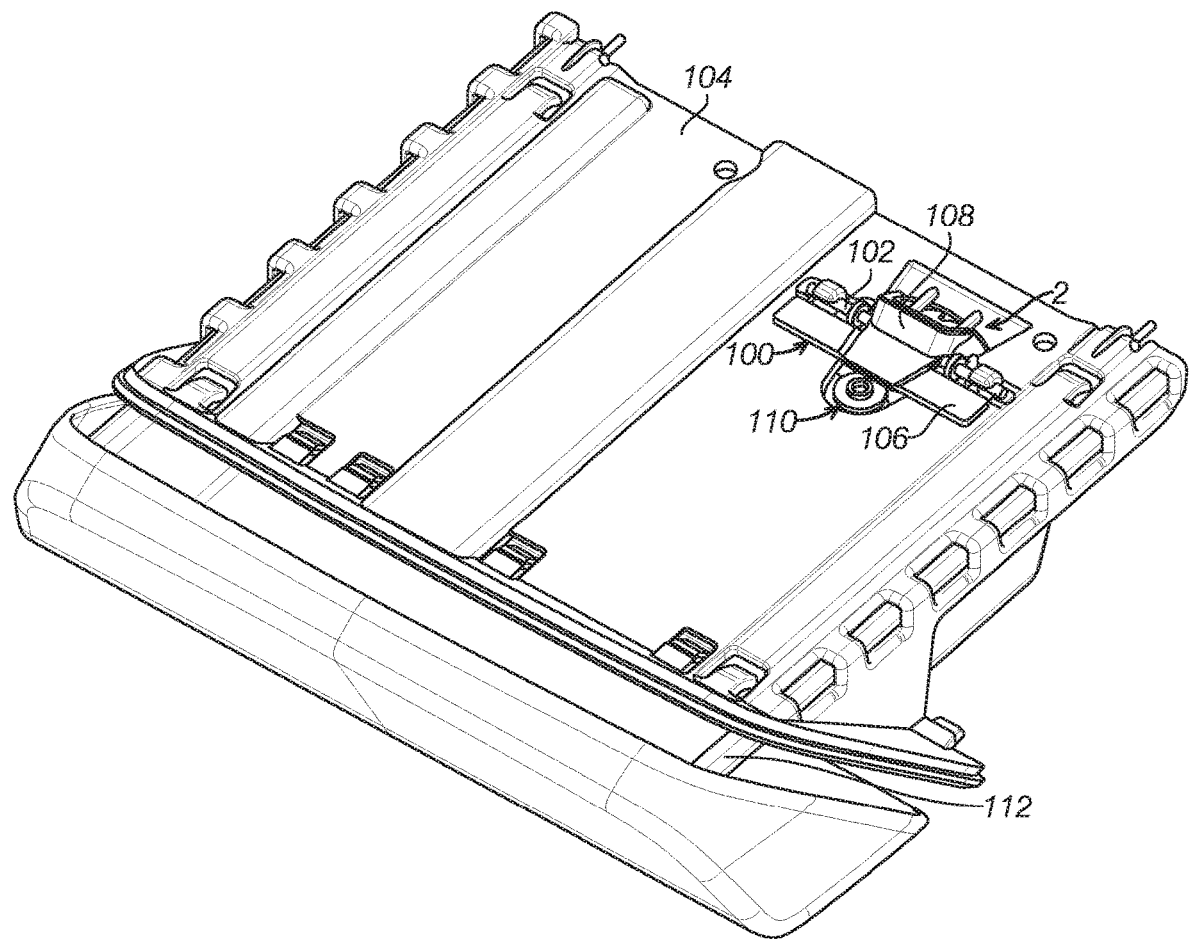
FIG. 1A is a perspective view of an example push-push style drawer equipped with an inertia lock system of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed inertial lock systems for push-push latch style vehicle drawers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various inertial lock systems for push-push latch style vehicle drawers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1A-5, a first example of an inertial lock system 2 for push-push latch style vehicle drawers will now be described. Inertial lock system 2 comprises an inertia lock 100 and a rotating latch 110. Inertia lock 100 functions to capture the moving cam that is part of the push-push latch, and in so doing prevent the rotating latch 110 from being actuated to release the drawer. Moreover, the configuration of the inertially activated elements allows inertia lock 100 to automatically unlock once high g-forces are no longer experienced, and without the need for a spring or other apparatus to supply a countering force or a force to retain the lock in an unlocked configuration.

Referring to FIGS. 1A, 1B and FIGS. 3-5, inertia lock 100 includes a shaft 102 rotatably mounted on a drawer housing 104 which encloses a drawer 112. An inertia member 106 is mounted on shaft 102, and a confining member 108 is mounted on shaft 102 opposite to inertia member 106. Inertia lock 100 is configured to be activated to cause confining member 108 to move to a position to restrict movement of a rotating latch 110 of the drawer 112 when a g-force applied to drawer 112 exceeds a predetermined level.

FIG. 1A depicts a drawer assembly 10, with drawer 112 inside its drawer housing 104. Drawer 112 slides within housing 104. Inertia lock 100 is depicted mounted to one side of housing 104, and disposed above the rotating latch 110 that is part of the push-push latching mechanism. While inertia lock 100 is configured to be positioned so that confining member 108 can entrap rotating latch 110, the particular position of inertia lock 100 and the push-push latching mechanism need not be on any particular side of housing 104. Inertia lock 100 and the associated push-push latching mechanism can be disposed upon housing 104 at any suitable location. Further, the drawer can be any suitable shape.

Figure 1B:
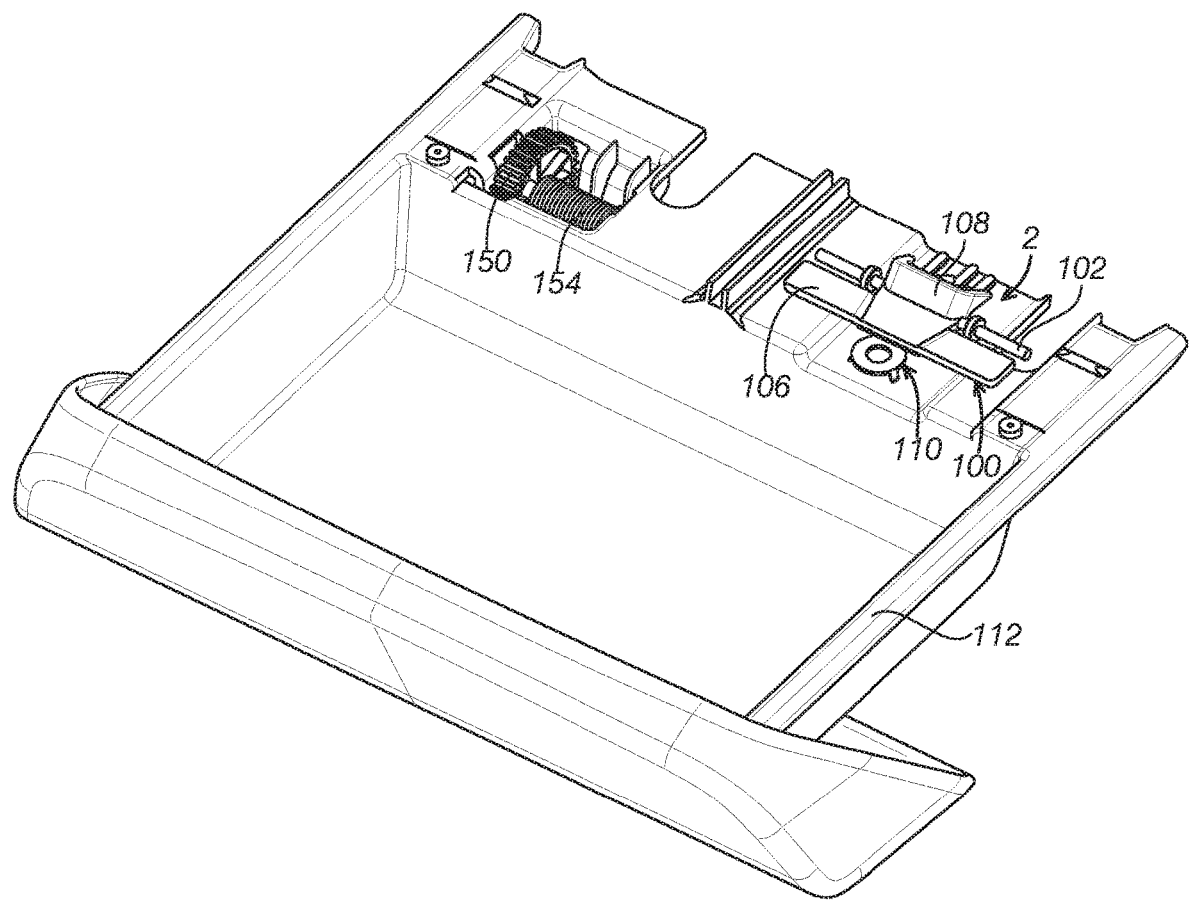
FIG. 1B is a perspective view of the example drawer depicted in FIG. 1A, with the top cover removed so as to illustrate the internal mechanisms of the drawer and inertia lock system.
Figure 1C:
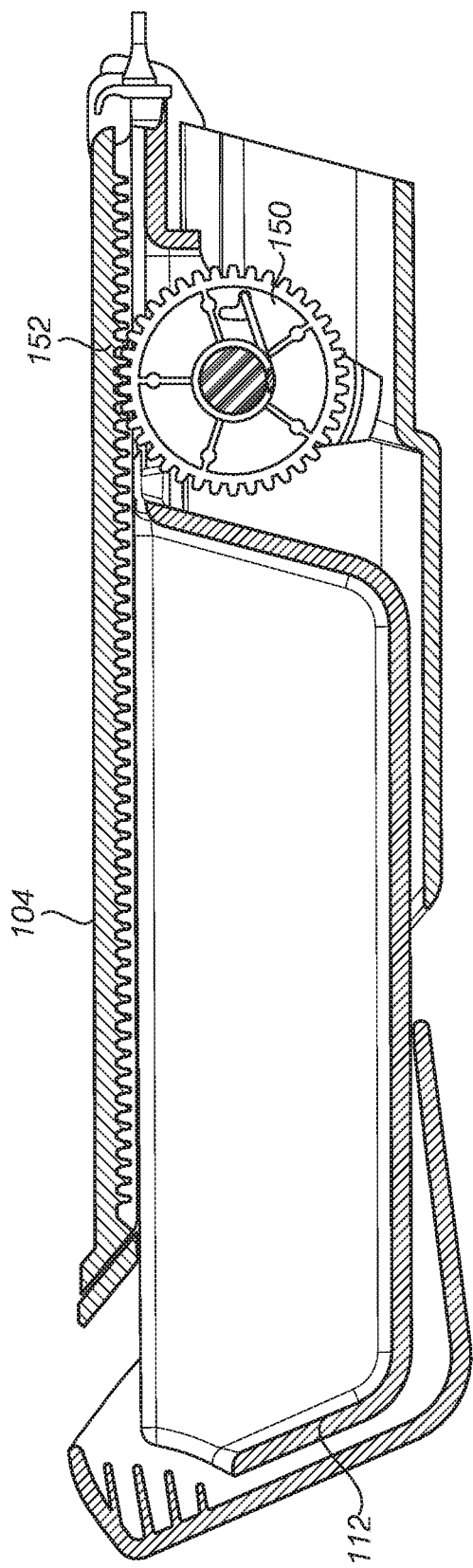
FIG. 1C is a side view of the example drawer depicted in FIG. 1A, showing the internal mechanisms of the drawer in profile.

Referring to FIGS. 1B and 1C, drawer 112 is depicted with the internal components shown more clearly. Inertia lock 100 is depicted above rotating latch 110, with its pivot point 116 (shown in FIGS. 2A to 2C) visible. However, it will be readily understood by a person skilled in the art that inertia lock 100 itself is only attached to drawer housing 104, which is in turn affixed to the vehicle, thereby preventing drawer 112 from moving when inertia lock 100 is engaged. FIG. 1C shows gear 150 and drawer spring 154. Drawer spring 154 is mechanically linked to gear 150 and drawer 112 so as to impart a turning force upon gear 150. Gear 150 in turn engages a toothed channel 152 that is attached to or a part of drawer housing 104. Drawer spring 154 is preferably preloaded so that gear 150 continuously is applying a force against channel 152 to bias drawer 112 from drawer housing 104. When drawer 112 is opened, depending on the amount of force drawer spring 154 is configured to supply, drawer 112 may be biased to either a partially or completely open position. Drawer 112 will remain open until the spring force is overcome by a user pushing the drawer 112 closed. As will be described in more detail below, the force imparted by drawer spring 154 also keeps drawer 112 in a latched position via the action of the push-push latching mechanism, as well as helps prevent drawer 112 from automatically unlatching due to inertia from object contained within drawer 112. A person skilled in the relevant art will understand that the configuration of the spring mechanism described in the foregoing is only one possible implementation; drawer 112 and drawer housing 104 can be configured with any suitable mechanism that achieves the same effect as the disclosed spring mechanism.

Drawer housing 104 and drawer 112 can be manufactured from any suitable material or combination of materials as would be typically used in vehicle drawer applications. Such materials can include metal, plastic, composites, wood, or any combination of the foregoing, or any other suitable material now known or later developed.

Figure 2A:
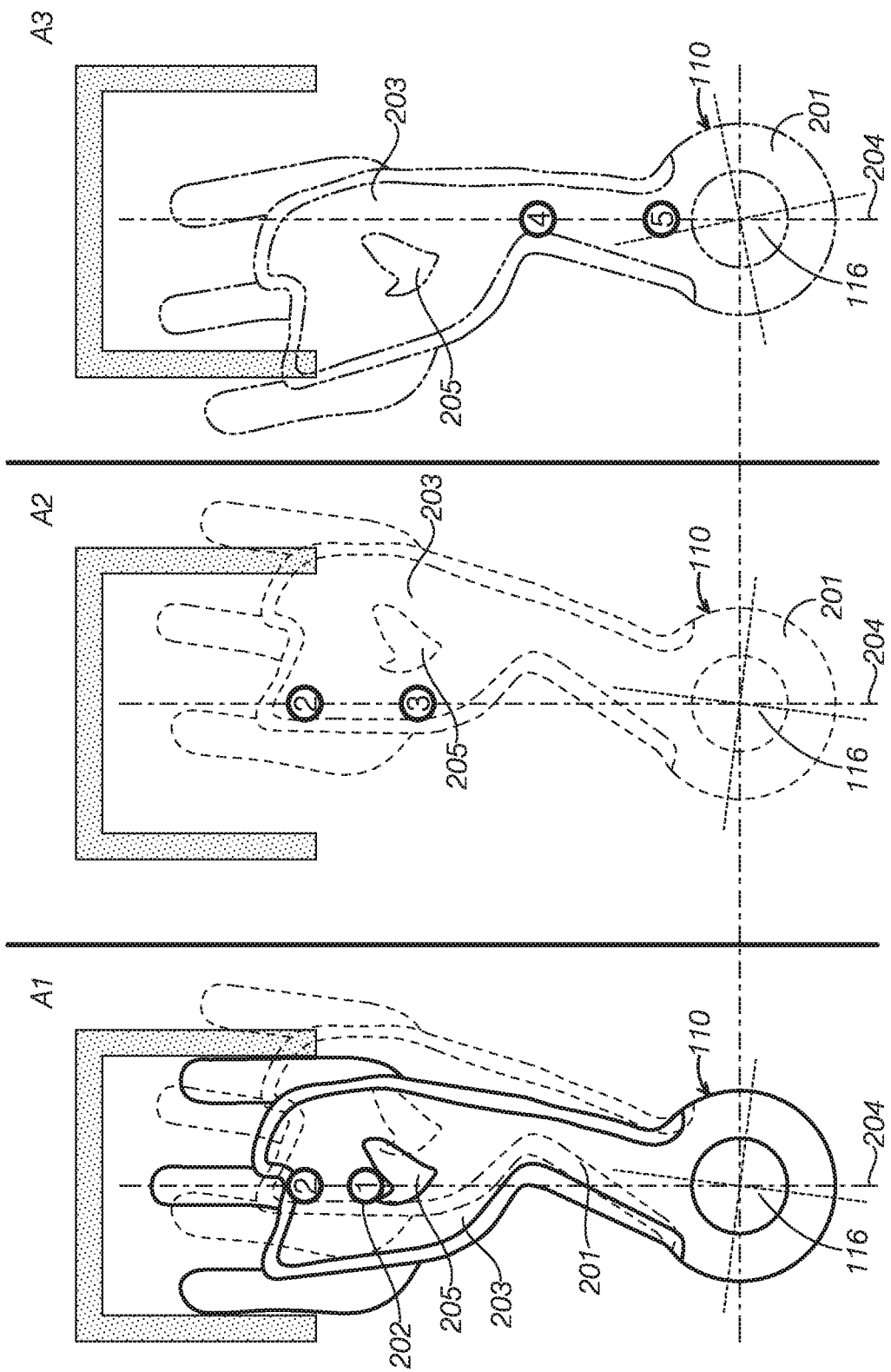
FIG. 2A schematically illustrates a mechanism of a rotating latch to open a push-push style drawer by releasing a pin.

FIG. 2A depicts the sequence of rotating latch 110 for opening the drawer 112 via the push-push mechanism. Pin 202 is attached to a base or a surface of the drawer 112 and moves forward and backward along an axis 204. Axis 204 is dictated by a drawer runner. The rotating latch 110 includes an arm 201, a hand 203, and a pin holder 205 to retain pin 202. Rotating latch 110 is pushed or rotated by pin 202. Drawer 112 opens with a small forward push by user. The rearward movement (opening) of drawer 112 is achieved by the drawer spring 154. Drawer spring 154 may open the drawer 112 to its fully open position. For example, once the rotating latch 110 is rotated to release pin 202 from pin holder 205, pin 202 travels forward passing point 2, before the drawer 112 moves rearward due to the bias of spring of drawer spring 154, which likewise causes pin 202 to travel rearward past points 3, 4 and 5 in order as shown in the numbers within the circles. Position 5 may be the drawer's fully open position as shown in positions A1, A2 and A3.

Figure 2B:
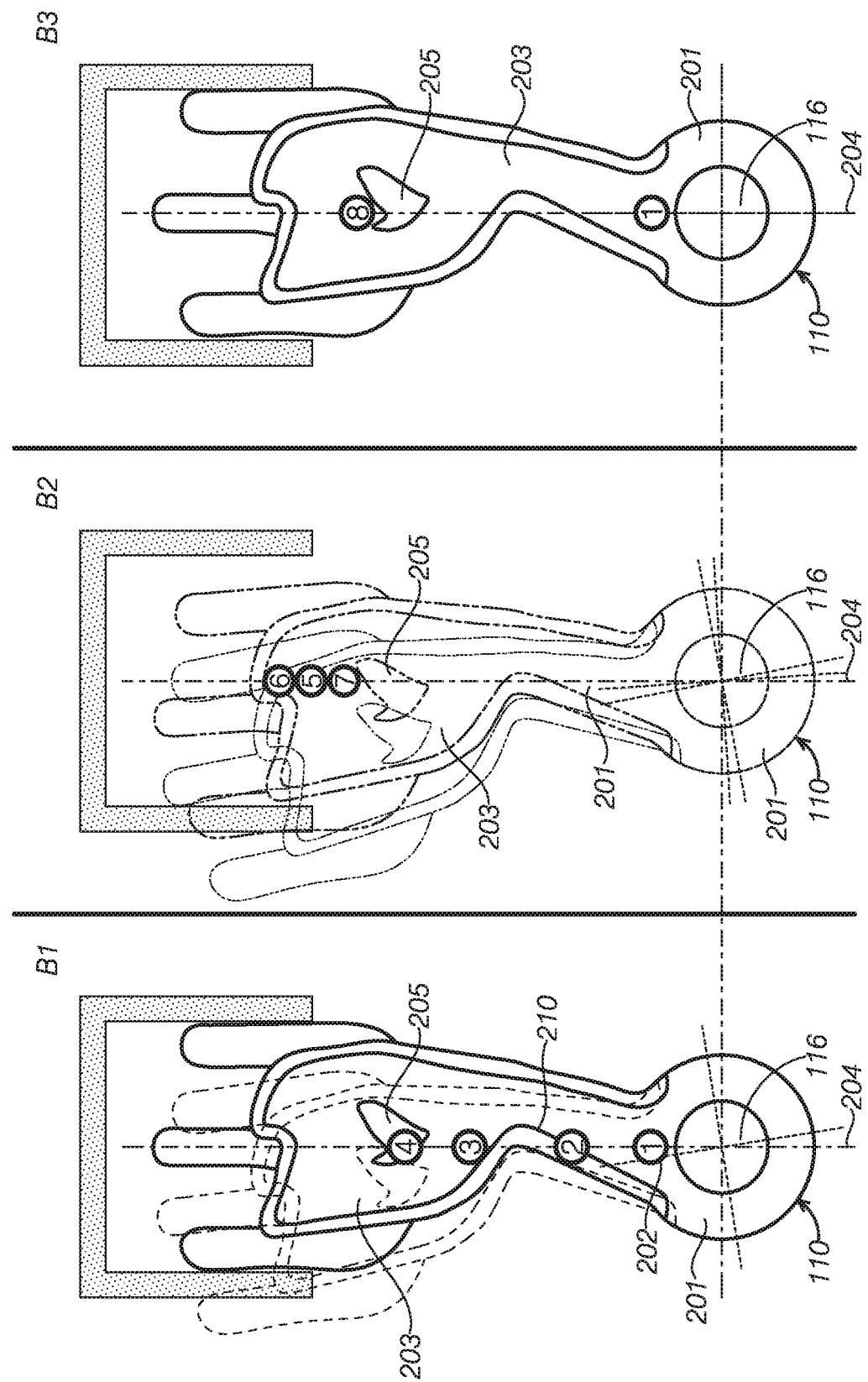
FIG. 2B schematically illustrates the mechanism of the rotating latch depicted in FIG. 2A to close the drawer by retaining a pin.

Referring to FIG. 2B, the sequence of rotating latch 110 for relatching or locking the push-push mechanism is shown. Starting position B1 corresponds to position A3 in FIG. 2A. As the user applies a force to drawer 112, pin 202 on the drawer 112 moves forward and rotates rotating latch. Pin 202 passes points 1, 2, 3, 4, 5, 6, 7 before it is contained in pin holder 205 at the locked position at point 8. There is a small amount of over-travel (e.g. at or about point 6) prior to pin 202 coming to rest at point 8. Pressure applied by drawer spring 154 urges pin 202 against pin holder 205, which is what keeps drawer 112 in a latched position.

Figure 2C:
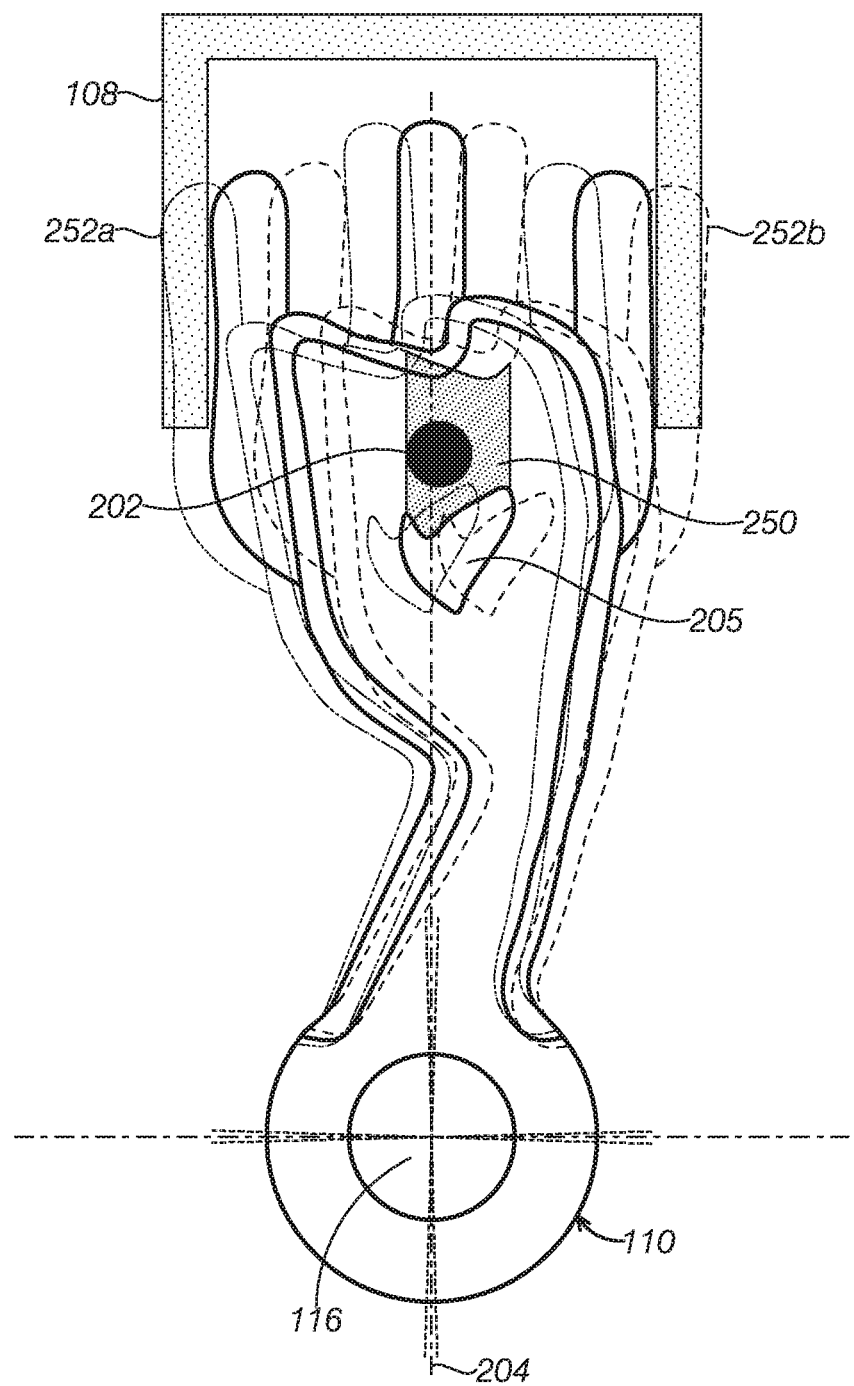
FIG. 2C schematically illustrates the mechanism of the rotating latch depicted in FIG. 2A when the inertia lock depicted in FIG. 1A is engaged.

Turning to FIG. 2C, the action of inertia lock 100 to prevent the push-push latch from actuating is depicted. Confining member 108 is depicted engaging against the sides of rotating latch 110. When confining member 108 surrounds each side of rotating latch 110, rotating latch 110 is prevented from moving to either position 252a or 252b, necessary for rotating latch 110 to move to release pin 202. Thus, when confining member 108 engages rotating latch 110, pin 202 is confined substantially to shaded area 250, and cannot move past pin holder 205. As pin 202 is attached to drawer 112, drawer 112 is thus prevented from being unlatched and is retained in a closed position.

It should be appreciated that the arm and hand, or "fork" shape of rotating latch 110 depicted in the figures is one possible embodiment. Rotating latch 110 could be configured in other shapes so long as the its functionality as disclosed here is substantially retained. Rotating latch 110 could be constructed from plastic, metal, ceramic, composites, wood, any combination of the foregoing or any other suitable material now known or later developed.

Figure 3:
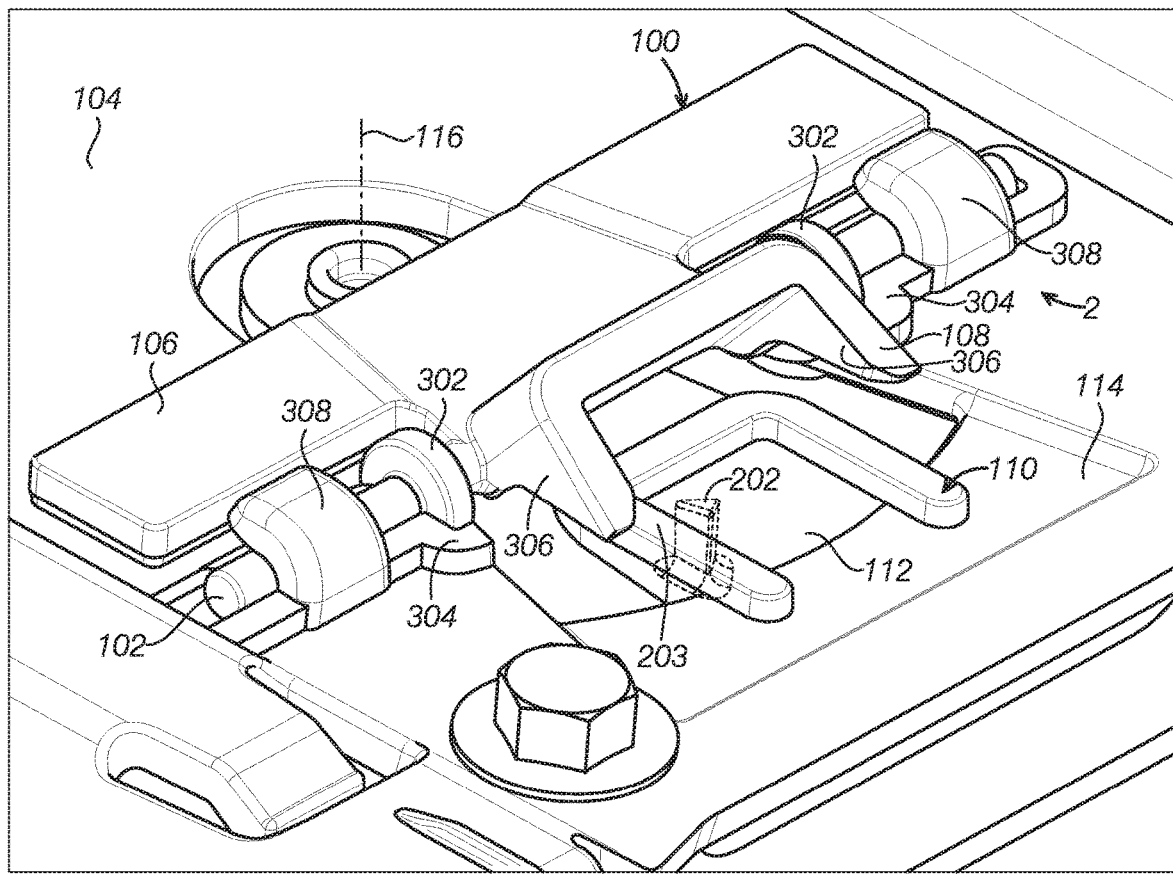
FIG. 3 is a close-up view of the example embodiment of an inertia lock depicted in FIG. 1A, with the inertia lock in an un-activated state.
Figure 4:
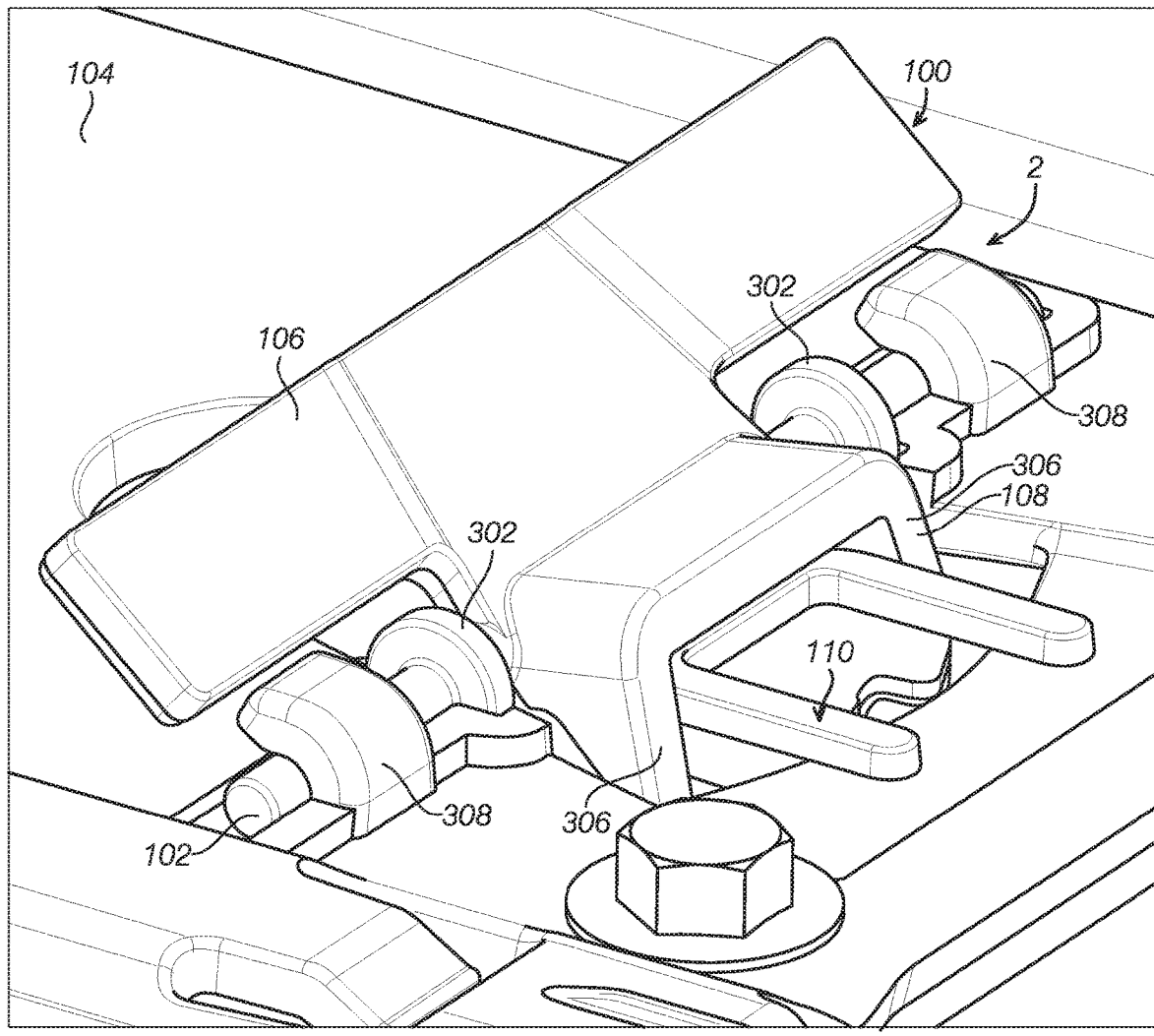
FIG. 4 illustrates the example embodiment of an inertia lock depicted FIG. 3, with the inertia lock in an activated state.
Figure 5:
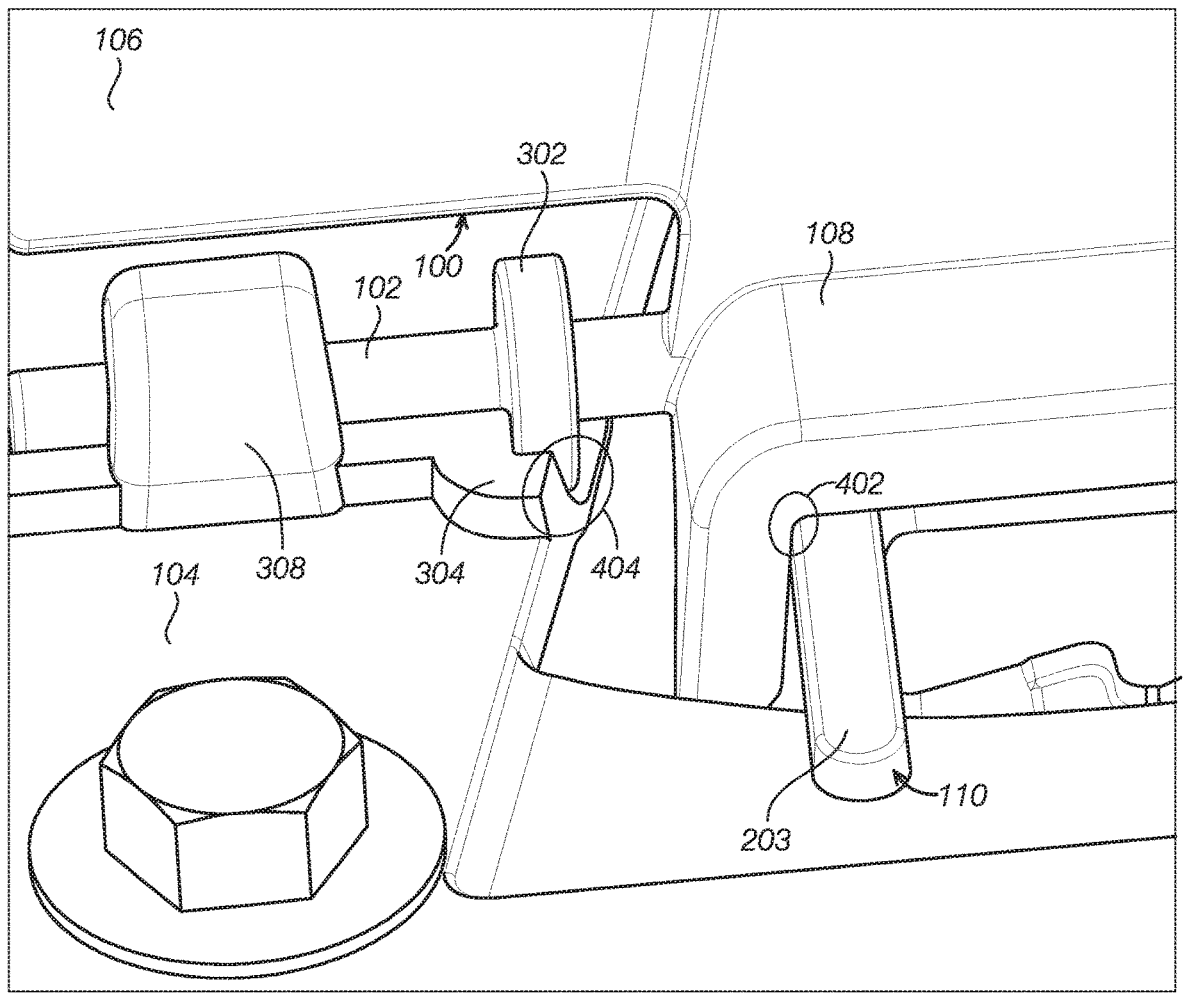
FIG. 5 is an enlarged view of the inertia lock mechanism depicted in FIG. 3, with the inertia lock in an activated state.

In the depicted embodiment shown in FIGS. 3 and 4, the components of inertia lock 100 are shown in greater detail. As shown in FIG. 3, rotating latch 110 is disposed on an outer surface 114 of drawer housing 104 and is configured to rotate around its pivot point 116 on an axis substantially perpendicular to an outer surface of the drawer housing 104. Inertia lock 100 is disposed on the outer surface 114. In some embodiments, inertia lock 100 is disposed above a portion of rotating latch 110. Inertia lock 100 may include inertia member 106 and confining member 108, which are disposed on shaft 102. Shaft 102 is disposed at the top of drawer housing 104, with its axis substantially perpendicular to the travel of drawer 112. As will be appreciated from the foregoing discussion of the operation of the push-push lock, for inertia lock 100 to be consistently effective in operation, the position of confining member 108 is configured to restrict movement of rotating latch 110 to keep it locked when the inertial lock is activated. To effect this, two side stoppers 302 are disposed on shaft 102 on either side of confining member 108, thereby minimizing lateral movement of rotating latch 110 on shaft 102. As can be seen in FIGS. 3-5, each side stopper 302 contacts a shoulder portion 304 of drawer housing 104 where inertia lock 100 is mounted, thereby preventing improper and excessive movement of shaft 102 and thus maintain the desired position of inertia member 106 and confining member 108.

In the disclosed embodiment each side stopper 302 is implemented as a ring that surrounds shaft 102. It will be appreciated that the position of each side stopper 302 on either side of confining member 108 is only one possible implementation. Side stoppers 302 could be positioned at the ends of shaft 102. In other implementations, side stoppers 302 could be omitted, and the retaining functionality instead implemented in drawer housing 104, where shaft 102 mounts to drawer housing 104, such as a channel shaped to at least partially enclose shaft 102 and confine movement along its rotational axis.

Inertia member 106 is disposed on one side of shaft 102 along with confining member 108, which itself is disposed on an approximately opposite side of inertia member 106. Also depicted in FIG. 3 is the resting position of pin 202 which is disposed or molded on a surface of drawer 112. Shaft 102 can be constructed from plastic, metal, ceramic, composites, wood, any combination of the foregoing or any other suitable material now known or later developed.

As can be seen in FIGS. 3 and 4, inertia member 106 and confining member 108 are disposed radially from shaft 102 and form an angle between them. When in an un-activated state, inertia member 106 may lay on a top surface of drawer housing 104. In some embodiments, inertia member 106 may be disposed with clearance from the top surface of drawer housing 104. Inertia member 106 and confining member 108 may be configured to be balanced at an un-activated state at which confining member 108 is lifted clear of engaging rotating latch 110, to allow drawer 112 to be freely latched and unlatched. Further, inertia member 106 and confining member 108 are configured to be maintained at the un-activated state unless a predetermined g-force applied to drawer 112 is exceeded. The un-activated position is depicted in FIG. 3.

When inertia lock 100 experiences g-forces that exceed the predetermined value, the impact will cause confining member 108 to be dropped down to the top surface of drawer housing 104 to enclose rotating latch 110, that is, the inertia lock is activated. At the activated state, confining member 108 is engaged with rotating latch 110 and inertia member 106 is lifted above the top surface of drawer housing 104, which is depicted in FIG. 4.

Inertia lock 100 is preferably oriented along a longitudinal direction of the vehicle so that sudden deceleration of sufficient g-force will cause inertia lock 100 to be activated. In installations for the disclosed embodiment, inertia member 106 is positioned towards the front of the vehicle, with the rotational axis of shaft 102 being disposed substantially perpendicular to the vehicle's direction of travel. Sufficient g-force thus causes inertia member 106 to travel forward and rotate away from the top surface of drawer housing 104. This imparts a rotational force to shaft 102, further causing confining member 108 to rotate down to engage rotating latch 110, and prevent drawer 112 from unlatching and opening. Upon cessation of the sufficient g-force, gravity will act upon inertia member 106 to cause it to move back down in contact with drawer housing 104, imparting a rotational force upon shaft 102 to cause confining member 108 to rotate up and away from latch 110, freeing drawer 112 to be opened.

Inertia member 106 needs to be of greater mass than confining member 108, so that the default resting position of confining member 108 is clear of rotating latch 110, and thus the default configuration of inertia lock 100 is unlocked.

Furthermore, the ratio of the mass of inertia member 106 and confining member 108 determines the threshold g-force at which inertia lock 100 will move from an unlocked to a locked configuration. This ratio can be tuned to be appropriate to a given application, and/or to comply with regulatory requirements.

In some embodiments, inertia member 106 may be substantially paddle-shaped or a plate; however, this is not intended to be limiting. Inertia member 106 could be any shape suitable to the application and the packaging space in which drawer 112 and drawer housing 104 are employed, so long as the mass of inertia member 106 is greater than the mass of confining member 108. Inertia member 106 can further be constructed of any suitable material to the intended application. For example, inertia member 106 could be constructed from plastic, metal, ceramic, composites, wood, any combination of the foregoing or any other suitable material now known or later developed.

Confining member 108 likewise is depicted as essentially an inverted "U" or claw-like shape, to correspond to the forked end shape of rotating latch 110, with the sides of the U engaging with the corresponding prongs at the end of rotating latch 110, enclosing at least a portion of rotating latch 110. However, this is provided by way of example only. The shape of confining member 108 will be tailored to the shape of rotating latch 110; where rotating latch 110 is configured differently than in the figures, confining member 108 will likewise be configured differently to maintain its locking functionality. For example, confining member 108 may at least include two side walls 306 disposed outside of hand 203 of rotating latch 110 to restrict the movement of the rotation of rotating latching 110 to an extent that pin 202 cannot be released from pin holder 205. Confining member 108 could be constructed from plastic, metal, ceramic, composites, wood, any combination of the foregoing or any other suitable material now known or later developed.

Drawer housing 104 may further include two protrusions 308 on its outer surface 114 (depicted in FIG. 3) to receive and secure shaft 102. Each protrusion may have C-shape or L-shape and have a recess to receive shaft 102.

FIG. 5 provides a close up view of inertia lock 100 at an activated state, illustrating how confining member 108 interacts with rotating latch 110. Specifically, confining member 108 is designed to entrap rotating latch 110, thereby preventing rotating latch 110 from pivoting laterally to release pin 202 and allow drawer 112 to open when the predetermined force is exceeded. At least one of engagement points 402 and 404 may occur at the activated state. That is, a point, a line or a portion of side stopper 302 contacts a point, a line or a portion of shoulder portion 304 at engagement point 404 and a point, a line or a portion of an inner surface of confining member 108 contacts a point, a line or a portion of an outer surface of hand 203 of rotating latch 110 at engagement point 402. These contacts enable locking of rotating latch 110.

Shaft 102, inertia member 106, confining member 108 and side stoppers 302 can be manufactured as discrete components, or, to save time and costs, could be manufactured as a single integrated part via any manufacturing process suitable to the materials used, e.g. injection molding where plastics are utilized, or casting or machining where metal is used.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An inertia lock to maintain a drawer in a closed position under a g-force by acting on a rotating latch mounted on the drawer, the inertia lock comprising:
    a shaft rotatably mounted on a drawer housing;
    an inertia member mounted on the shaft; and
    a confining member mounted on the shaft and disposed opposite to the inertia member; and
    two side stoppers disposed on the shaft,
    wherein the confining member is configured to move to a position to restrict movement of the rotating latch of the drawer when a g-force applied to the drawer exceeds a predetermined level;
    wherein the inertia lock is adapted to be disposed above a portion of the rotating latch and the confining member is configured to enclose a body of the rotating latch when activation of the inertial member causes the confining member to rotate down to the position to restrict the movement of the rotating latch; and
    wherein the confining member is disposed between the two side stoppers, wherein each side stopper is configured to engage with a corresponding shoulder portion on the drawer housing to prevent lateral movement of the shaft.

2. The inertia lock of claim 1, wherein the inertia member is a plate and the confining member has a claw shape, and wherein a mass of the inertia member is greater than that of the confining member.

3. The inertia lock of claim 1, wherein the side stoppers are rings surrounding the shaft.

4. The inertia lock of claim 1, wherein the inertia member, the confining member, the shaft, and the side stoppers are formed integrally via an injection molding.

5. An inertial lock system in a drawer, comprising:
    a rotating latch mounted on a surface of the drawer and configured to rotate around an axis on a drawer housing between a latched and unlatched position;
    an inertia lock mounted on the drawer housing, wherein the inertia lock includes a shaft rotatably mounted on the drawer housing, an inertia member and a confining member, wherein the confining member and the inertia member are mounted on the shaft and disposed opposite each other,
    wherein the inertia lock is configured to be activated to cause the confining member to move to a position to restrict movement of the rotating latching such that the rotating latch is maintained in a latched position when a g-forced applied the drawer exceeds a predetermined level;
    wherein the inertia lock is disposed above a portion the rotating latch and the confining member is configured to enclose a body the rotating latch when activation of the inertial member causes the confining member to rotate down to the position to restrict the movement of the rotating latch; and
    wherein the inertia lock further includes two side stoppers disposed adjacent and outside to two side walls of the confining member, respectively, wherein each side stopper is configured to engage with a corresponding shoulder portion on the drawer housing to prevent lateral movement of the shaft.

6. The inertial lock system of claim 5, wherein the rotating latch is configured to retain and release a pin mounted on the drawer via rotation, and wherein the drawer is capable of being opened when the pin is released from the rotating latch at an unlatched position and is closed when the pin is retained in the rotating latch at the latched position.

7. The inertial lock system of claim 5, wherein the the two side walls of the confining member are configured to at least partially enclose the rotating latch when the inertia lock is activated and the confining member is rotated down to the surface of the drawer housing.

8. The inertial lock system of claim 6, wherein the rotating latch includes an arm and a hand configured to retain the pin.

9. The inertial lock system of claim 8, wherein the inertia member is a plate and the confining member has a claw structure, and wherein the claw structure is disposed above the hand of the rotating latch at an un-activated state and the claw structure at least partially encloses the hand of the rotating latch at an activated state.

10. The inertial lock system of claim 5, wherein the inertia member returns to an un-activated state when the applied force is reduced to a value under the predetermined level and wherein the confining member is located outside a path of movement of the rotating latch at the un-activated state.

11. A drawer in a vehicle, comprising:
    a pin;
    a drawer housing enclosing the drawer;
    a rotating latch mounted on an outer surface of the drawer housing and configured to retain and release the pin of the drawer via rotation, wherein the drawer is capable of being opened when the pin is released from the rotating latch and is closed when the pin is retained in the rotating latch;
    an inertia lock mounted on the outer surface of the drawer housing, wherein the inertia lock includes a shaft rotatably mounted on the drawer housing, an inertia member mounted on the shaft and a confining member mounted on the shaft, wherein the confining member is disposed opposite to the inertia member, and wherein the inertia lock is configured to be activated to cause the confining member to move to a position to restrict movement of the rotating latching when a g-force applied the drawer exceeds a predetermined level, and
    a spring mounted on the drawer and configured to bias the drawer to an open position when the pin is released from the rotating latch;
    wherein the inertia lock is disposed above a portion the rotating latch and the confining member is configured to enclose a body the rotating latch when activation of the inertial member causes the confining member to rotate down to the position to restrict the movement of the rotating latch; and wherein the inertia lock further includes two side stoppers disposed adjacent and outside to the confining member, wherein each side stopper is configured to engage with a corresponding shoulder portion on the drawer housing to prevent lateral movement of the shaft.

12. The drawer of claim 11, further comprising two protrusions on the outer surface of the drawer housing, wherein the two shoulder portions are disposed on the outer surface of the drawer housing, wherein the each side stopper is disposed against the corresponding shoulder portion on the drawer housing and a contact between the side stopper and the corresponding shoulder portion prevents the lateral movement of the shaft, and wherein each of the protrusions includes a recess to receive the shaft.

13. The drawer of claim 11, wherein the rotating latch includes an arm having one end fixed to the drawer housing and a hand configured to receive the pin, wherein the rotating latch is configured to rotate around an axis substantially perpendicular to the outer surface of the drawer housing, and wherein the rotating latch lays on the outer surface of the drawer housing.

14. The drawer of claim 13, wherein the inertia member is a plate and the confining member has a claw structure, wherein the inertia lock is disposed above the rotating latch, and wherein the plate raises up to rotate the claw structure down so as to partially enclose the hand of the rotating latch when the inertia lock is activated.

* * * * *